Figure 1:
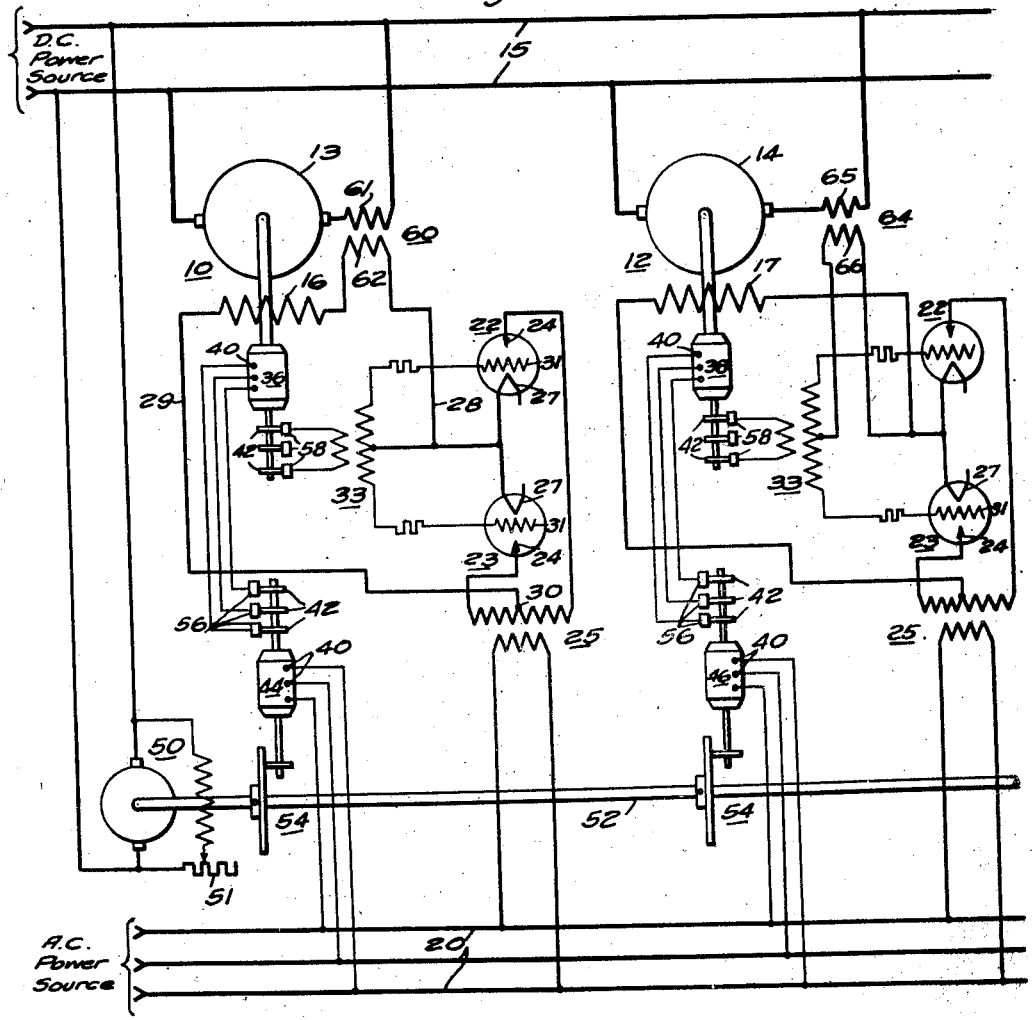

Feb. 12, 1935.  A. D. FORBES  1,991,088
REGULATING SYSTEM
Filed Oct. 31, 1933  2 Sheets-Sheet 1

WITNESSES:

INVENTOR
Allan D. Forbes.
BY
ATTORNEY

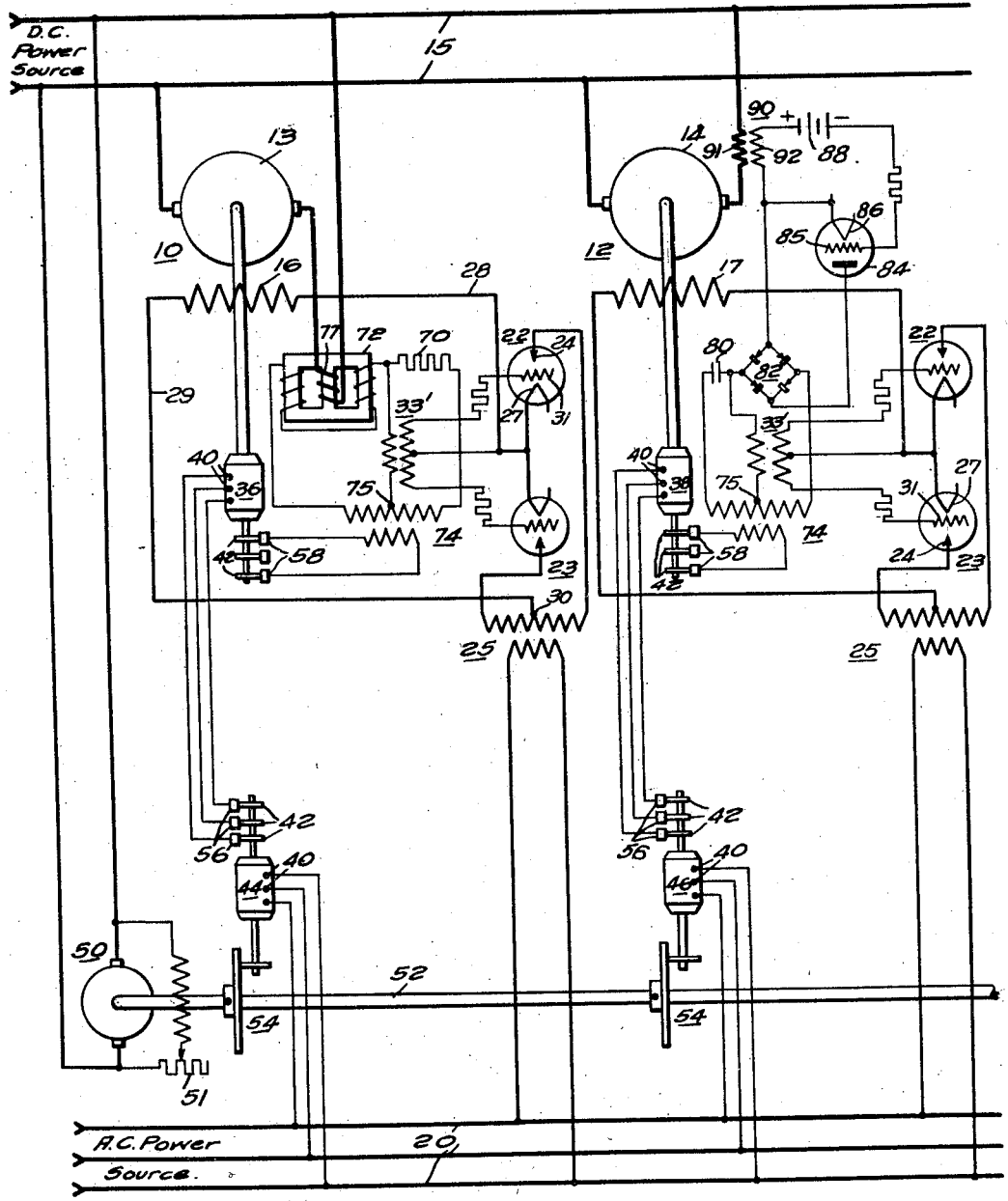

Patented Feb. 12, 1935

1,991,088

UNITED STATES PATENT OFFICE 1,991,088

REGULATING SYSTEM

Allan D. Forbes, Wilkinsburg, Pa., assignor to Westinghouse Electric & Manufacturing Company, East Pittsburgh, Pa., a corporation of Pennsylvania Application October 31, 1933, Serial No. 696,033

5 Claims. (Cl. 172—293)

My invention relates to regulating systems and it has particular relation to systems for maintaining the speeds of a plurality of electrical machines in a predetermined relationship.

In certain situations where a plurality of separate driving motors are utilized to propel different portions of a common equipment, such, for example, as in the art of paper making, it is essential that the speeds of the several motors be very accurately maintained in predetermined relation. In a copending application, Serial No. 691,159, filed September 27, 1933, by S. A. Staege and assigned to the Westinghouse Electric & Manufacturing Company, there is shown and described a regulating system, especially adapted for service of the above-described type, which causes each of the regulated motors to rotate at a speed which is in synchronous relation with an alternating-current speed-setting machine or master circuit.

In that particular system, each of the regulated motors, which, for applications of this kind are of the direct-current type, is provided with electronic-tube speed-adjusting means sensitive to changes in the phase position of an alternating-current pilot voltage, having a frequency proportional to the motor speed, which is compared with a master alternating-current voltage the frequency of which is proportional to the desired speed of the motor.

In one embodiment of the invention of the above-mentioned copending application, the machine pilot voltage is directly impressed upon the control elements of the speed-adjusting electronic tubes which act to rectify and control the magnitude of current supplied from an alternating-current power source to one of the motor windings. In the particular embodiment referred to, this source must be the generator which supplies the master or speed setting voltage, which requirement necessitates that the master generator be of a capacity sufficient to supply the motor winding energization. My invention is directed to improvements in the basic system above described which permit the motor winding current supplied through the controllable electronic tubes to be derived from a source of power other than the master generator, and which provide further advantages to be particularized hereinafter.

One object of my invention is to provide an improved form of regulating system in which the speed of each of the regulated machines is determined by the frequency of the output voltage of a master or speed setting machine.

Another object of my invention is to provide a regulating system of the speed-matching type already described which permits the energization for the controlled winding of each regulated motor to be supplied from an alternating-current power source other than the associated master generator.

A further object of my invention is to improve the arrangement of the speed adjusting and other control devices comprised by the regulating system in such manner that all adjusting operations may be made from a common or central control point.

A still further object of my invention is to provide improved anti-hunting and compensating means for speed regulating systems of the above-described and other equivalent types.

Figure 2:
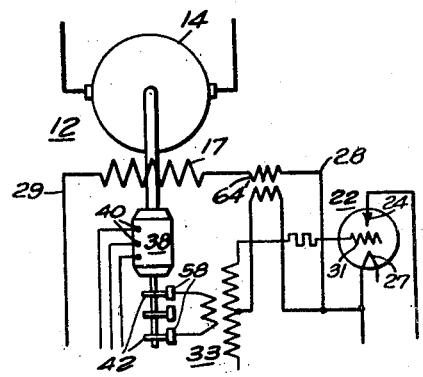

My invention itself, together with additional objects and advantages will best be understood through the following description of specific embodiments thereof, when taken in conjunction with the accompanying drawings, in which Figure 1 is a diagrammatic view illustrating apparatus and circuits comprised by a preferred form of the regulating system of my invention shown as being applied to control the speeds of a plurality of direct-current motors;

Fig. 2 is a partial reproduction of the system of Fig. 1 showing the stabilizing transformer connected in the field winding circuit of the regulated motor; and Fig. 3 is a similar diagrammatic view of apparatus and circuits illustrating other types of anti-hunting equipment applied to the regulating system disclosed in Fig. 1.

Referring to the drawings and particularly to Fig. 1 thereof, two of the plurality of direct-current motors whose speeds are to be regulated are illustrated at 10 and 12. The motors comprise armature windings 13 and 14 respectively, which are suitably connected for energization from a source of direct current power, illustrated in the form of circuit conductors 15, and field windings 16 and 17, which derive their energization from rectified current supplied from an alternating current power source designated by the conductors 20.

In the field winding circuit of each of the motors is provided a pair of electronic tubes, or other equivalent devices, such as liquid-pool cathode rectifiers provided with make-alive elements which must be excited to institute conduction during each positive half cycle of anode voltage, which act as controllable rectifying means. In the case of motor 10, these devices are shown at 22 and 23 as having anode elements 24 connected to opposite ends of the secondary winding of a transformer 25, the primary winding of which transformer is directly connected to the supply conductors 20. The cathode elements 27 of the devices are joined together and connected through conductor 28 to one side of the motor field winding 16, the other side of which winding is connected by means of conductor 29 to the mid-tap 30 of the secondary winding of transformer 25.

Devices 22 and 23 are illustrated as grid-controlled gas-filled tubes, each being capable of conducting current only from the anode element to the cathode element. Consequently in the connection shown, tube 22 will pass current during alternate half cycles of the voltage acting in power circuit 20, while the tube 23 will similarly pass current during the remaining half cycles of the voltage wave, the combination thus effecting full-wave rectification.

The effective value of this rectified current supplied to the field winding through the tubes may, as is well known in the art, be controlled by changing the characteristics of the potential impressed upon the tube grid elements 31. When this control voltage is of the alternating current variety and of a frequency equal to that of the power source voltage impressed upon the anode elements of the tube, changes in the phase displacement between these two voltages effect an adjustment of the effective conductivity of the tubes through a wide range. When the displacement is slight, conduction will be instituted at an early point in the positive half cycle and continuing as it does during the remainder of that half cycle, the effective current passed by the tube will be maximum. However, as the displacement of the grid voltage with respect to the tube anode voltage is made to approach 180°, the conduction starting point is progressively delayed with a resulting decrease in effective tube conductivity until it is substantially interrupted.

In accordance with the system of my invention, this grid control potential is supplied through a suitable transformer 33 directly from the output terminals of a pilot generator of the alternating current type which is driven at a speed definitely related to that of the regulated motor. As illustrated, these pilot generators, which are shown in Fig. 1 at 36 and 38 in association with motors 10 and 12 respectively, are in the form of induction generators which in mechanical construction may be similar to wound rotor-induction motors. Each of these generators thus comprises armature windings (not shown) terminating in terminals 40 and rotor windings (also not shown) the connections of which are brought out to slip rings 42.

The machine stator windings are shown as being excited from the output circuits of master generators 44 and 46 respectively, which master generators are also of the induction type, they being similar in mechanical construction to the machines 36 and 38 already described. Each comprises stator windings (not shown), terminating in terminals 40, illustrated as being excited through a direct connection with the three-phase power source 20, and rotor windings which terminate in slip rings 42.

Master generators 44 and 46 are driven at predeterminedly related speeds by any suitable means illustrated in the form of a direct current motor 50 which is of the adjustable speed variety. As shown, this motor is energized from the direct current power source 15 and is provided with a speed changing rheostat 51. Motor 50 drives by means of shaft 52, the master generators 44 and 46 through speed changing mechanisms 54 which may be of any one of a well known number of types.

These master generators are in this manner driven at speeds somewhat different from the synchronous speed determined by the frequency of the exciting source 20, in order that there may be impressed, through brushes 56, upon the armature winding of the associated pilot generators, alternating current exciting voltages of a frequency lower than that of the master generator exciting circuit. If the frequency of this circuit is the usual 60 cycles per second, the master generator speeds would be so set that the frequency of the exciting voltages supplied thereby to the pilot generators associated with the regulated motors might, for example, be of the order of from 20 to 40 cycles per second.

Likewise when the speeds of the regulated machines 10 and 12 are of the desired value, the pilot generators 36 and 38 driven thereby are rotated at speeds so differing from their excitation determined synchronous values that the output voltages thereof supplied to the motor-speed controlling electronic tubes through brushes 58 will be raised to the same value as that of the alternating current power circuit 20 which in the case assumed, is 60 cycles. In other words, while the master generators 44 and 46 act to produce an output voltage of lower frequency than that of the exciting circuit 20, the pilot generators 36 and 38 excited by these output voltages act to again raise the frequency back to the original value possessed by exciting circuit 20, which circuit, as has been pointed out above, constitutes the power source for the field windings of the regulated motors 10 and 12.

In operation of the regulating system just described, a detailed consideration of the manner in which the speed of motor 10 is maintained in synchronous relation with respect to that of master generator 44 will first be made. When the output voltage of pilot generator 36 is in phase with the voltage of supply circuit 20, the grid control potentials applied to electronic tubes 22 and 23 will have a similar in-phase relation to the tube anode potentials and the tubes will be operating under their maximum conductivity condition, as before explained. However, as the output voltage of pilot generator 36 deviates in phase position from that of power source 20, the grid control voltages supplied through transformer 33 will similarly deviate from the anode voltages of the electronic tubes with the result that the conductivity of these tubes will progressively decrease as the displacement angle approaches 180°.

During normal operation of the regulating system of Fig. 1, the output voltage of pilot generator 36 is displaced from the voltage of supply circuit 20 by an intermediate angle greater than zero and less than 180°, which renders the excitation control tubes 22 and 23 of intermediate conductivity and supplies to field winding 16 of motor 10 the value of excitation required to maintain the motor speed at the desired value. As the speed of regulated motor 10 drops below this desired value, however, the output voltage of pilot generator 36 driven thereby will be displaced from the voltage of power source 20 by a larger angle, which will thereby cause the conductivity of tubes 22 and 23 to decrease. The resulting reduction in motor excitation causes the motor to appropriately speed up.

In a similar manner when the motor speed exceeds the desired value, the voltage of pilot generator 36 will approach in phase position that of supply circuit 20 with the result that the conductivity of electronic tubes 22 and 23 will then be raised. The resulting increase in motor excitation will, of course, act to appropriately lower the motor speed.

It will thus be apparent that the system of my invention comprises means whereby each of the regulated motors will be caused to run at the speed which maintains the output voltage of its pilot generator in synchronism with the voltage of the alternating current circuit from which the speed-control electronic tubes are supplied, variations in the speed all being kept within the range of one-half cycle of power source voltage. The regulation is, therefore, exceedingly accurate and capable of precise adjustment.

The explanation of operation just given relative to regulated motor 10 also applies to motor 12 and the equipment shown in association therewith and to any additional motors which may be similarly controlled. By adjusting, through a change of setting of the speed-changing devices 54, the relative rates at which the master generators 44 and 46 are driven, comparable adjustments in the relative speeds at which regulated motors 10 and 12 will be maintained may be effected. Hence without changing the speed of the common driving shaft 52, the speeds of the several regulated machines may be varied relative to each other in any desired manner.

When it is desired to raise or lower the speeds of all of the regulated motors in a similar manner or in the same proportion, this may be done by appropriately varying the speed of master generator driving motor 50 between which and each of the driven generators, the speed changing equipments 54 are placed.

It will be noted that in the system disclosed in Fig. 1, a separate master generator is required for each of the regulated motors. This provision permits each of these motors to drive its pilot generator at a constantly related speed at all times and thus makes the provision of a speed-change mechanism intermediate the motor and the pilot generator, which otherwise would be required, unnecessary, the more desirable disposition of such mechanisms being in association with the master generators as shown, since these generators, together with their driving means, may be located at a central or other common control point readily accessible to an operator or control attendant.

It will be understood that while adjustment of the motor speed is illustrated as being effected by changing the motor excitation, the speed may also be controlled by adjusting the armature winding current of each regulated motor, in which case the excitation would be set at some fixed value. My invention, therefore, contemplates a control of speed either by armature or field winding current adjustment.

In order to improve the stability of the regulating system, anti-hunting means may, if desired, or found necessary, be combined therewith. In the showing of Fig. 1, two preferred forms of anti-hunting means are illustrated respectively in association with motors 10 and 12. In the case of motor 10, these means comprise a transformer 60, primary winding 61 of which is connected in circuit with the motor armature winding to be influenced by the energizing current supplied thereto and the secondary winding 62 of which is connected in the energizing circuit of the motor field winding 16. Upon the occurrence of corrective changes in the speed of regulated motor 10, there will result corresponding changes in the armature winding current of the motor. These changes cause to be induced in the secondary winding of transformer 60 voltages proportional to their direction and rate of change, which voltages act to so modify the current flowing in the field winding 16 of the motor that overshooting of the corrective actions will be effectively prevented.

The anti-hunting means illustrated in association with motor 12 comprise a somewhat similar transformer 64 having a primary winding 65 connected in circuit with the motor armature winding 14 and a secondary winding 66 connected to introduce the output voltage of the transformer into the circuit through which the grid-influencing transformer 33 supplies the alternating control potential to the controllable rectifier tubes 22 and 23. As long as the motor armature winding current remains constant, there will be no voltage induced in the secondary winding of transformer 64 and the regulating system will operate in the normal manner already explained in detail in connection with motor 10.

However, upon the occasion of a speed corrective adjustment in the motor excitation, the corresponding change in armature winding current will cause transformer 64 to introduce into the grid circuits of electronic tubes 22 and 23, a direct current voltage of a polarity depending upon the direction of armature current change and of a magnitude depending upon the rate of this change. The effect of this superimposed unidirectional voltage is to shift the axis of the wave of control voltage impressed upon the grid elements of tubes 22 and 23 out of coincidence with the axis of the power supply voltage wave impressed from source 20 upon the anode elements of these tubes. Such a shift in axial relation between the two voltage waves affects the conductivity characteristics of the electronic tubes in the same manner as does a corresponding shift in the phase position of the two waves so that transformer 64 thus modifies the excitation adjustment of the regulated motor 12 in response to changes in armature winding current of the motor, the modification being in such manner that overshooting of the corrective actions of the regulated system is effectively prevented.

If desired the stabilizing transformer may be connected in the field winding circuit of the regulated motor as shown at 64' in Fig. 2. For such a connection the anti-hunting influences are of course supplied in accordance with the direction and rate of change of motor excitation which in certain instances may be of greater advantage than the corresponding scheme of Fig. 1.

In Fig. 3, I have illustrated other types of anti-hunting means which may be combined with the regulating system of my invention. As in Fig. 1, two motors to be regulated are shown at 10 and 12, the pilot generators 36 and 38 of which respectively supply control potentials to speed-adjusting tubes 22 and 23. Instead of coupling the output circuits of the pilot generators directly to the grid influencing transformer 33 of the electronic tubes, phase shifting bridge circuits responsive to changes in the current acting in one of the windings of the regulated motor are interposed between the pilot generators and electronic tubes in the manner shown.

Considering first the equipment associated with motor 10 of Fig. 3, the interposed phase shifting bridge circuit comprises a series connection of a resistor 70 and a reactor device 72, which connection is energized, through a transformer 74, by the output voltage of pilot generator 36. Intermediate the common connection between device 70 and 72 and the mid-point 75 of the secondary winding of transformer 74 is connected the primary winding of the grid influencing transformer 33'. The effect of the phase shifting bridge circuit just described is to displace the voltage supplied to transformer 33' with respect to that supplied to transformer 74 by an angle the magnitude of which may be shifted by changing the characteristics either of the resistor 70 or of the reactor 72. In the combination shown, the reactor 72 is the adjustable element, it being of a well known saturable core type provided with an exciting winding 77 which is influenced by the energizing current supplied to armature winding 13 of motor 10.

As long as the motor winding current remains constant, the magnitude of phase shift between the voltages of transformer 74 and 33' will be constant and the regulating system will operate in the manner explained in connection with Fig. 1. However, upon the occurrence of speed corrective changes in the form of adjustments in the current supplied to field winding 16, the resulting changes in armature energizing current will modify the reactance presented by device 72 in a direction to retard the changes in phase angle of the control voltage, supplied by pilot generator 36, which instituted the excitation adjustment. The direction of these modifications is such that overshooting of the corrective actions is thereby prevented.

In association with motor 12 of Fig. 3, a somewhat different form of phase shifting bridge circuit is illustrated. This circuit comprises a series connection of a capacitor 80 and a full wave rectifier 82 disposed for energization by the voltage of pilot generator 38 acting through transformer 74. Connected with the output terminals of rectifier 82 is an electronic tube 84, the grid element 85 of which is maintained at a small value of negative bias with respect to the filament element 86, by means of a battery 88 or other suitable source of direct current potential. Should it be desired, biasing potential may instead be supplied from the alternating current power source 20 through an auxiliary rectifier and filtering equipment.

To modify this grid bias in accordance with changes in the energizing current supplied to one of the windings of the regulated motor 12, a transformer 90, shown as being responsive to the current in armature winding 14, is utilized. The primary winding 91 of this transformer is directly influenced by the motor winding current, while the secondary winding 92 is connected in the grid supply circuit of vacuum tube 84.

As long as the motor winding current remains constant, the impedance characteristic of tube 84 will remain unchanged and the magnitude of phase displacement between the voltage supplied to transformer 74 by pilot generator 38 and the voltage supplied to the grids of electronic tubes 22 and 23 by transformer 33' will be constant. However, in the event of a corrective action instituted by the regulating system, the resulting change in motor winding current will cause transformer 90 to introduce into the grid circuit of tube 84 a direct current voltage which in polarity is dependent upon the direction of current change and in magnitude is proportional to the rate of this current change. This voltage modifies the magnitude of grid bias supplied to tube 84 and by changing its impedance characteristics varies the effective resistance of rectifier 82. Such variation changes the magnitude of phase shift between the voltages of transformer 74 and 33' in a direction to prevent overshooting of the corrective action.

Although I have shown and described certain specific embodiments of my invention, I am fully aware that many modifications thereof are possible. My invention, therefore, is not to be restricted except insofar as is necessitated by the prior art and by the scope of the appended claims.

I claim as my invention:

1. A speed-regulating system for an electric motor comprising, in combination, a source of alternating current power, a current-adjusting device disposed intermediate the motor and the power source to control the motor speed, a pilot generator of the induction type driven by the motor and disposed to supply a control voltage to said device, a master generator of the induction type connected to receive excitation from said power source, means for driving said master generator, and means for exciting the pilot generator by the output voltage of the master generator, said generators being driven at such speeds that when the speed of the regulated motor is of the desired value the control voltage supplied to the adjusting device will have a frequency which is synchronous with that of the power source voltage.

2. A speed-regulating system for an electric motor comprising, in combination, a source of alternating-current power, a current-adjusting device disposed intermediate the motor and the power source to control the motor speed, a master induction generator excited by the power source, means for driving said generator at such speed that the output voltage produced thereby is of a frequency below that of the power source voltage, a pilot induction generator driven by the motor and excited by the master generator, and means for controllably impressing the pilot generator voltage upon the current-adjusting device, said pilot generator being so driven that when the motor speed is of the desired value, the said control voltage will have a frequency which is the same as that of the power source voltage.

3. A speed-regulating system for an electric motor comprising, in combination, a source of alternating-current power, a current-adjusting device disposed intermediate the motor and the power source to control the motor speed, a master induction generator excited by the power source, means for driving said generator at such a speed that the output voltage produced thereby is of a frequency below that of the power source voltage, a pilot induction generator driven by the motor and excited by the master generator, and means for controllably impressing the pilot generator voltage upon the current-adjusting device, said pilot generator being so driven that when the motor speed is of the desired value the said control voltage will have a frequency which is the same as that of the power source voltage, said current-adjusting device being responsive to the phase displacement between said control and power source voltages and thus acting to maintain the motor speed at the value which keeps the pilot generator voltage in synchronism with the power source voltage.

4. In a system for maintaining the speeds of a plurality of motors in a predetermined relation, the combination of a source of alternating-current power, a current-adjusting device disposed intermediate each of the motors and said source to control the motor speed, a master induction generator for each motor excited from the power source, motive means for driving all of said master generators, speed-changing means disposed intermediate said motive means and each generator to adjust the relative values of driven speeds, a pilot induction generator driven by each of said motors and excited by the output voltage of the associated master generator, and means for controllably impressing the output voltage of each of said pilot generators upon the current-adjusting means of each associated motor.

5. In a speed-regulating system for a direct-current motor having field and armature windings, said system comprising a device for adjusting the current in one of said windings, means for converting deviations from a desired value in the speed of the motor into changes in a control voltage, and means for impressing said voltage upon the device, the combination of stabilizing means for said system comprising a transformer having a primary winding energized by the current acting in one of said motor windings and a secondary winding connected in direct series circuit relation with the other of said motor windings.

ALLAN D. FORBES.